Patented Feb. 9, 1943

2,310,278

UNITED STATES PATENT OFFICE 2,310,278

HYDROGENATING WITH CATALYST

Gerald C. Connolly, Baton Rouge, La., assignor to Standard Catalytic Company, a corporation of Delaware No Drawing. Application May 20, 1938,
Serial No. 209,147

5 Claims. (Cl. 196—53)

This invention relates to catalysts for hydrogenation of hydrocarbon oil.

It has heretofore been proposed to treat hydrocarbon oil with hydrogen in the presence of a hydrogenating catalyst to obtain various objectives such as for example, for conversion, purification and refining. In general, all of such hydrogenating processes pass a mixture of oil and hydrogen vapors at elevated temperatures of the order of 300° C. to 600° C. or more and while under high hydrogen pressures such as 20 atmospheres or more in contact with a hydrogenating catalyst such as the oxides or sulphides of the sixth group metals and particularly the sulphides of tungsten and molybdenum. In many cases it is the practice to support the hydrogenating catalyst and a support or carrier such as activated carbon, adsorptive clays or other adsorptive material having a porous structure presenting a large surface area.

It is a common experience that as the hydrogenating process proceeds, the activity of the catalyst gradually diminishes. To offset the diminishing activity, it has been the practice in many cases to gradually increase the reaction temperature. However, while conversions can be maintained constant over a longer period in this manner, there are maximum temperature limitations beyond which, in view of the high pressures employed, it is not safe to go. Moreover, when such catalysts are exposed to high temperatures substantially in excess of 1000° F. the porous structure of the carrier tends to be destroyed, due to the normal presence of relatively low fusing salt impurities therein. In view of these factors, it has not proved practical heretofore to regenerate such catalyst. As a result when the activity of the catalyst has been reduced to a point where further hydrogenation becomes uneconomical it has been the practice to discard the catalyst or to treat it to recover the catalyst constituents therefrom.

One of the objects of the present invention is to use a hydrogenating catalyst having a higher efficiency than catalysts of the types heretofore employed.

Another object of the invention is to use a catalyst more resistant to high temperatures and capable of undergoing regeneration by oxidation without impairment of activity.

Other objects and advantages of the invention will be apparent from the more detailed description hereinafter.

In accordance with the present invention, one of the major components of the catalyst is silica gel impregnated with or otherwise combined with alumina in the manner hereinafter described to form a mixed gel having an apparent density between 0.4 and .8, and preferably between .4 and .65.

The term apparent density as here employed means the weight in grams of one cubic centimeter of 4–12 mesh granules. Apparent density measurements have been found to be an indirect but nevertheless definite indication of the size of the gel pores. It should be mentioned at this point that such synthetic gels are characterized by a porous capillary structure formed of ultra microscopic pores and the size and nature of such pores has an important bearing on the activity of the catalyst.

The mixed silica and alumina gel may be made by forming what is known as a plural gel in which the gel is formed from a single hydrosol containing both silica and alumina in colloidal form. Such composite hydrosol may be formed by combining a hydrolyzable salt of alumina such as aluminum chloride or sulphate with sodium silicate under conditions which will prevent immediate precipitation of the oxides. The proper conditions for producing a plural gel containing two or more components are well known to the art and need not be here described.

The plural gel after standing until the gel structure is fully developed is then broken into fragments, washed free of reaction products, dried and afterwards slowly heated to a temperature of 800° and maintained at such temperature for a period of about two hours.

If desired, the plural gel prior to or subsequent to the washing treatment may be soaked in an ammonium hydroxide solution or other non-alkaline base. Such treatment may be employed for regulating the apparent density of the resulting gel and for fixing the alumina content. Regulation of apparent density can be accomplished by varying the concentration of the ammonium hydroxide and duration of treatment. Increase in concentration or duration of treatment reduces apparent density.

Another method of forming the mixed silica and alumina gel is to first form the silica hydrogel by substantially neutralizing an alkaline silicate such as sodium silicate in a manner well known in the art to form a firm colloidal hydrogel of silica, thereafter washing the hydrogel substantially free of reaction products, drying the hydrogel, impregnating the washed and dried hydrogel with a solution of a compound of aluminum such as aluminum nitrate capable of being converted to the oxide and converting the aluminum compound into aluminum oxide. When forming the mixed gel according to this method, the apparent density of the resulting product can be controlled within the desired limits by varying the temperature or duration of the washing process. To decrease apparent density, the temperature and/or duration of the washing treatment should be increased and vice versa. However, it is important to continue the washing treatment until the product is substantially free of reaction salts.

In either method of preparation, the relative proportions of silica and alumina may be varied as desired. In the first case, namely, the production of a plural gel, the relative proportions of silica and alumina will depend upon the relative proportions of sodium silicate and aluminum salt employed in making up the gel. In the second case in which silica hydrogel is impregnated with a solution of aluminum compound convertible to an oxide, the relative proportions will depend upon the concentration of the salt solution used.

The relative proportions of silica and alumina present in the catalyst may vary over an extended range without seriously affecting the activity thereof. Mol ratios of silica to alumina of from 2 to 1 to 20 to 1 can be employed for example, although mol ratios of from 10 to 1 to 15 to 1 and especially 12 to 1 are preferred.

The mixed gel formed by either of the above methods having an apparent density of from about 0.4 to 0.65 forms one of the major components of the catalyst. The other component of the final catalyst comprises a hydrogenating catalyst such as an oxide or sulphide of a metal of group VI and particularly the oxides or sulphides of molybdenum or tungsten.

It is desired to mention at this point that the mixed silica and alumina gel not only forms a support or carrier for the active hydrogenating catalyst but also serves as a catalytic agent in bringing about the desired reaction. It is particularly active for bringing about destructive hydrogenation.

The hydrogenating component may be combined with the mixed gel by co-impregnation of the silica hydrogel with a solution containing a mixture of salts of aluminum and the hydrogenating catalyst and thereafter decomposing the salts or the plural gel or aluminum impregnated gel may be separately impregnated with a decomposable salt of the desired hydrogenating catalyst and the salt subsequently converted to an oxide or sulphide. For example, the mixed silica and alumina gel may be thoroughly soaked in a solution of ammonium thio-molybdate or ammonium thio-tungstate and thereafter converted into the desired sulphide by heating to a temperature of the order of 800° F. for example.

Another method of combining the molybdenum, tungsten or other hydrogenating catalyst with the silica and alumina gel is to add a solution of the desired hydrogenating catalyst to the hydrosol of silica or the plural hydrosol of silica and alumina prior to the formation of the final hydrogel.

According to another phase of this invention, the gel component may be given a light treatment with hydrofluoric acid. In many cases the efficiency of the catalyst may be materially improved in this manner. To this end, the base silica hydrogel, the alumina impregnated hydrogel or the plural silica-alumina hydrogel may be treated with a 1% solution of hydrofluoric acid. As a further alternative, the hydrogel, either the silica hydrogel, impregnated hydrogel or plural hydrogel or the dried gel of any of the above hydrogels may be impregnated with aluminum fluoride. In such cases additional aluminum will be incorporated into the catalyst.

The following examples will aid in a better understanding of the invention, it being understood that the conditions given therein are illustrative rather than limitive.

*Example 1*

A dried plural gel of silica and alumina having a mol ratio of silica to alumina of about 10 to 1 is impregnated with a 10% of ammonium thio-molybdate. The resulting wet product is then dried and heated in an atmosphere of hydrogen sulphide to convert the ammonium thio-molybdate to molybdenum polysulphide having a mol ratio of sulphur to molybdenum of between 2 and 3, preferably about 2.5. The drying and sulphidizing treatment may be carried out in the hydrogenating chamber either prior to or during the initial stages of the hydrogenating process. The resulting product has a high hydrogenating activity and can be regenerated periodically without harmful effect on its activity.

*Example 2*

A mixed gel of silica and alumina is formed by first impregnating silica hydrogel with an aluminum nitrate solution having a 10% concentration of $Al(NO_3)_3$ until the hydrogel is thoroughly wet. The product is then dried and heated to decompose the nitrate to the oxide. The product is then soaked with ammonium thio-tungstate and decomposed in a hydrogen sulphide atmosphere to form tungsten polysulphide.

*Example 3*

The mixed silica alumina gel prepared as described in Examples 1 and 2 is initially treated with a weak solution of hydrofluoric acid and then impregnated with a decomposable salt of tungsten or molybdenum.

Having described the preferred embodiment of my invention, it will be understood that it embraces such other variations and modifications as come within the scope of the appended claims.

I claim:

1. The process for the destructive hydrogenation of hydrocarbon oils which comprises passing a mixture of said oil and hydrogen containing gas through a hydrogenating zone maintained under destructive hydrogenating conditions of temperature, pressure and relative proportions of hydrogen and oil and contacting said oil and hydrogen while within said zone with a catalyst comprising a carrier composed of silica and alumina formed by impregnating silica hydrogel with a compound of aluminum convertible to the oxide and thereafter converting said aluminum compound to the oxide, said carrier so formed being impregnated with an active hydrogenating catalyst and maintaining said oil and hydrogen within said zone for a period sufficient to destructively hydrogenate said oil.

2. In a process for hydrogenation of hydrocarbon oils wherein a mixture of hydrogen and oil to be hydrogenated is passed under super atmospheric pressure through a reaction zone containing a hydrogenating catalyst maintained at a temperature sufficient to effect hydrogenation of said oil; the improvement which comprises employing within said reaction zone a catalyst comprising a composite gel of silica and alumina and containing a metal compound of group VI taken from the class consisting of the oxides and sulfides.

3. The invention defined in claim 2 wherein the molar ratio of silica to alumina present in the catalyst is between 2 to 1 and 20 to 1.

4. The invention defined in claim 2 wherein the gel catalyst is formed by impregnating the hydrogel of silica with a compound of aluminum convertible to the oxide and the impregnated hydrogel then dried and the compound converted to the oxide.

5. The invention defined in claim 2 wherein the gel is pretreated with a fluorine compound.

GERALD C. CONNOLLY.